United States Patent [19]

Frost et al.

[11] 3,996,062
[45] Dec. 7, 1976

[54] METHOD FOR REMOVING SCALE FROM METALLIC SUBSTRATES

[75] Inventors: Jack G. Frost; Larry D. Martin; William P. Banks, all of Duncan, Okla.

[73] Assignee: Halliburton Company, Duncan, Okla.

[22] Filed: Aug. 28, 1975

[21] Appl. No.: 608,823

[52] U.S. Cl. .................................. 134/2; 134/3; 134/28; 134/29; 134/41
[51] Int. Cl.[2] ..................................... C23G 1/00
[58] Field of Search .............. 134/3, 28, 29, 41, 2; 252/82, 87, 126, 127, 143, 180, 181

[56] References Cited

UNITED STATES PATENTS

| | | | |
|---|---|---|---|
| 2,261,700 | 11/1941 | Ryznar | 252/143 X |
| 2,524,825 | 10/1950 | Pabst et al. | 134/3 UX |
| 3,440,170 | 4/1969 | Hek | 134/3 X |
| 3,634,257 | 1/1972 | Porter et al. | 252/87 |
| 3,794,523 | 2/1974 | Thompson | 252/87 X |
| 3,854,996 | 12/1974 | Frost et al. | 134/3 X |

Primary Examiner—S. Leon Bashore
Assistant Examiner—Marc L. Caroff
Attorney, Agent, or Firm—Thomas R. Weaver; John H. Tregoning; William R. Laney

[57] ABSTRACT

Iron containing scale is removed from a metallic substrate by contacting the scale with a composition which is an aqueous solution consisting essentially of at least 0.5 weight percent of a polyphosphonic acid, or an alkali metal or amine salt of such acid, with the acid being selected from the group of acids having the formulae:

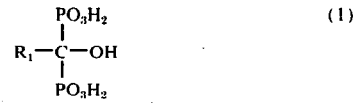

where $R_1$ is selected from the class consisting of $C_1$–$C_{12}$ alkyl groups, and the group

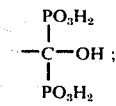

and

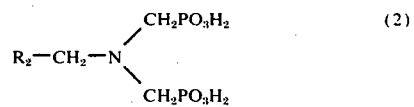

where $R_2$ is selected from the class consisting of —H, —$PO_3H_2$, $C_1$–$C_{12}$ alkyl groups, and the group

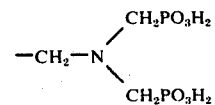

The scale is removed from the metallic substrate by contacting the described scale-bearing substrate with the described composition at selected temperature and pH conditions, and over a controlled time period and iron concentration in the composition so that the formation of an undesirable polymeric precipitate in the cleaning solution is avoided. Formation of the precipitate is also avoided by adding ammonium bifluoride to the composition.

11 Claims, No Drawings

METHOD FOR REMOVING SCALE FROM METALLIC SUBSTRATES

RELATED PATENT

This application contains subject matter related to that disclosed in Frost et al. U.S. Pat. No. 3,854,996 issued Dec. 7, 1974.

In steam boilers, feed water heaters and associated piping, and in various types of pressure vessels in which water is circulated and heat transfer occurs, water insoluble salts deposit on the metallic surfaces in contact with the water. Among other types of scale deposits which occur, the encrustation of the surface with tightly adherent and low porosity magnetite ($Fe_3O_4$) and with copper scale is often encountered. The scale must be periodically removed and the metal surfaces cleaned to restore efficient heat transfer, prevent burnouts due to hot spot development, and reduce restriction of the flow of fluid through the scale-blocked apparatus.

Various scale removing compositions have previously been employed. Inorganic acids, such as hydrochloric and phosphoric acid, and organic acids, such as tartaric acid, oxalic acid and citric acid, have been used to dissolve iron oxide scale. Alkali metal and amine salts of alkylene polyaine polyacetic acids have also been used to remove iron oxide deposits from ferrous metal surfaces.

After descaling, the spent treating solution is drained from the metallic structures treated, flushed with water, and, if an acid treating solution has been used, neutralized with an alkaline solution, and then again flushed with water. In some instances, such as the ammoniated ethylene diamine tetraacetic acid treating solutions, cleanup of the boiler or other apparatus treated, disposal of the treating solution and regeneration of the active treating material, are problems which are confronted in many instances due to the high solubility of the dissolved iron and of calcium salts in the treating solution. Some of the previously used treating solutions are also limited in the temperature and pH conditions under which they function effectively, and thus restrict the environments in which they may be utilized. The mineral acid treating solutions are limited in their usefulness due to their propensity to attack and corrode ferrous metals.

As a different approach to the problem of scale encrustation on metal substrates, scale inhibiting compositions of various types have been added to aqueous solutions which contact such substrates, and which contain ionic species capable of forming insoluble precipitates which are precursors of undesirable scale adherent to the substrate. One general class of scale inhibiting compositions which have been employed can be identified as chelating or sequestering compounds. Mechanistically, two types of scale inhibiting activity have been attributed to these compounds. First, where a so-called "threshold" amount or "sub-threshold" amount of the sequestering compound is used, sequestration of scale-forming cations in the aqueous solution either does not occur, or occurs incompletely. Rather, the presence of the sequestering compound appears to inhibit reaction of scale-forming cationic species with scale-forming anionic species to a degree such that the solubility in water of the resultant reaction product is not exceeded and no precipitation occurs. Subsequent scale formation is thus minimized.

In another mechanism by which sacle formation can be inhibited by the use of sequestering agents, an amount of these materials is incorporated in the aqueous solution which is at least equal to, and usually far exceeds, the stoichiometric quantity required to completely sequester all of the scale-forming cations present in solution. A complex is then formed by reaction between the sequestering agent and such cations, in preference to the deleterious scale-forming compounds which would otherwise be produced by the reaction between the offending cations and cetain anions in the solution. The complex thus formed may be either soluble or inosluble in water, depending upon the particular sequestrant used, the cation sequestered, and the quantitative ratio of one to the other. In either case, however, the formation of an adherent scale on the metal is inhibited.

Both of the described inhibiting mechanisms attributed to sequestering agents are based on the prevention of ions in the aqueous solution from combining to form insoluble scaly compounds or encrustations.

In Porter U.S. Pat. No. 3,634,257, a method is described for removing iron-containing encrustations and scale from a metallic substrate by contracting the substrate with certain types of diphosphonic acids of the formula

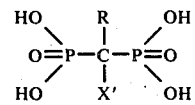

wherein R is an alkyl group having from 1 to 11 carbon atoms, and X' is OH or $NH_2$. Certain salts of this acid can also be used in aqueous solution to remove such encrustations and scale. According to the method disclosed in this patent, iron-containing encrustations, such as mill scale, can be removed from boiler tubes or similar structures by contracting the scale bearing substrate with an aqueous solution of the described acid or its salts at temperatures varying from ambient to 100° C.

It has been proposed by Frost et al. to remove iron oxide scale from ferrous metal substrates using phosphonic acid solutions of the general type disclosed in the Porter patent, and, by the inclusion in the acid solution of an oxidizing material capable of oxidizing ferrous iron to ferric ions and copper to cupric ions, to also remove encrustations and scale which contain copper as well as iron. The procedure contemplates the removal of magnetite and similar iron-containing scale from the metallic substrate by contacting the substrate and scale with the aqueous treating composition at certain specified temperatures and pH conditions. The scale is indicated to be removable when contacted by the aqueous phosphonic acid composition at a low pH and at temperatures of from about 140° F to about 180° F. At higher temperatures extending from about 180° F to about 300° F, solutions having a pH of as high as about 10.5 can be utilized. Where copper is present in the scale to be removed, a pH of at least 9 must characterize the treating solution during the copper removal phase, and it is preferable to carry out the process of removing scale containing both iron and copper by initially contacting the scale under suitable conditions for removing the iron, followed by reducing the temperature, elevating the pH and concurrently adding an oxidant to the solution to effectively remove the copper adhered to the metal substrate.

The present invention constitutes an improvement in the scale removal methods described in the Porter and Frost et al. patents, which improvement permits iron-containing scale to be more effectively removed from a metallic substrate, and also permits both such iron-containing scale and copper to be removed from the substrate by a two step procedure carried out under certain conditions of temperature, pH, time of contact and solution iron concentration which we have determined to be important to the smooth and efficient removal of both metallic species from the substrate.

It has been determined that, in contrast to previous suppositions concerning the inability to carry out magnetite scale removal from a metallic substrate at relatively low temperatures of from 140° F to 180° F without retaining the pH of the cleaning solution below about 7, the solution utilized at these temperatures can actually be effectively employed at a pH of as high as 8, and in fact, the preferred pH for use with solutions having a temperature in the described range is from about 7 to about 8. Moreover, scale removal in the solution pH range of from 4 to 8 can even be realized at solution temperatures as low as 110° F.

It has also been determined that when the composition is placed in contact with the sacle bearing substrate at relatively higher temperatures of from about 180° F to about 300° F, the contact time can be beneficially controlled so as to be of increasingly shorter duration as the temperature of contact is increased. Concomitantly, as the temperature of contact is increased, it is desirable to retain the iron concentration of the cleaning slution below certain decreasing solution levels. These determinations are based upon our observation that at the relatively higher temperatures described, an undesirable polymeric precipitate commences to form in the cleaning solution when certain maximum contact times are exceeded, and when the iron content of the cleaning solution is allowed to exceed certain maximum values. The formation of such precipitate is also related to the concentration of phosphonic acid (or salt) sequestrant in the solution. It is here pointed out that the term "weight percent", as used in this application, unless otherwise specifically defined, shall be defined as grams of the specific component referred to, per 100 milliliters of a specified solvent. Where the solvent is not specifically identified, it is water.

The process of the invention can be broadly described as contacting a metallic substrate carrying an iron-containg scale encrustation with an aqueous solution consisting essentially of at least 0.5 weight percent, and preferably less than 7.5 weight percent, of a polyphosphonic acid, or an alkali metal or amine salt of such acid (the term amine here includes the ammonium salt of such acid), with the acid being selected from the group consisting of acids having the formulae:

 (1)

where $R_1$ is selected from the class consisting of $C_1-C_{12}$ alkyl groups and the group

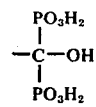

and

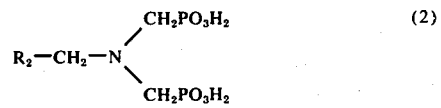 (2)

where $R_2$ is selected from the class consisting of —H, —PO$_3$H$_2$, $C_1$–$C_{12}$ alkyl groups and the group

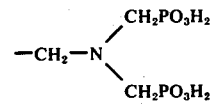

The aqueous solution can further contain, as a buffering or pH adjusting material, a basic amine compound or an alkali metal hydroxide compound which is compatible with the acid or salt which is the primary and funtional sequestrant or chelating agent in the composition as identified in the preceding paragraph. Finally, the composition can contain an effective amount of an oxidizing material capable of oxidizing ferrous iron to ferric ions and copper to cupric ions.

The temperature at which contact of a scale bearing metal is carried out is broadly from about 110° F to about 300° F, and the pH employed is broadly from about 4 to about 10.25. The contact time over which the process is continued is from about thirty minutes to a maximum of about twenty-four hours. The iron content (as elemental iron) of the cleaning solution during use is preferably not permitted to exceed about 0.9 weight percent. It is important to note that these variables are inerrelated so that the particular values of each of the parameters which is employed will be dependent upon the values of other parameters. This interrelationship will be explained in greater detail hereinafter.

As will be apparent from this broad description, the composition used in the invention is relatively simple in constitution and is easily formulated. Moreover, the scale removal method proposed is operative over a wide range of pH and temperature conditions, rendering it flexible and effective under a variety of cleaning conditions which may, for example, shorten the downtime of a boiler or its accessories, or may, in one instance, dictate metal treatment under acid conditions, and in another instance, under basic conditions.

It is further characteristic of one aspect of this invention that the process can be carried out as a two-step procedure in which magnetite is removed during the first step, and during the second step, copper deposits on the substrate are also removed by elevating or adjusting the pH of the solution to a pH of 9 or higher. The invention thus provides a very useful method for completely cleaning a metallic substrate which has undesirable deposits of copper thereon, as well as well as the more frequently occurring magnetite or other iron-containing scale.

Having broadly alluded to the method of the invention, and cited certain salient characteristics of the composition used in the method, the subsequent description herein will be directed to a consideration of certain preferred embodiments of the invention, and to a detailed description of these embodiments in conjunction with examples set forth as illustrative of typical practice of the invention and utilizing certain preferred embodiments of the invention. As has been previously stated, the active or effective component of the compositions used in the invention are certain organic polyphosphonic acids, or the amine or alkali metal salts thereof. In the most prevalent practice of the invention, an amine or alkali metal salt of one of the described acids will be utilized in the scale removal method and such salts may be initially included in the aqueous solution admitted to the boiler or other vessel to be cleaned, or the salt may be formed in situ by addition of an appropriate amine or alkali metal hydroxide to the solution after it is in place.

The types of acid utilized may vary widely within the broad structural definition of such acids as hereinbefore set forth, but certain species are preferred because of their relatively high magnetite removal efficiency, and relatively high rates of scale removal. Preferred acids for use in the invention are alkylene polyamine polyalkylene polyphosphonic acids conforming to the structural formula last above identified, and 1-hydroxyalkylidine-1, 1-diphosphonic acid. The most preferred acids are those which contain from 2 to 6 carbon atoms. Examples of these preferred acids are nitrilotri-(methylenephosphonic acid); 1-hydroxyethylidine-1, 1-diphosphonic acid; 1-hydroxypropylidene-1, 1-diphosphonic acid; N,N,N', N'-ethylenediaminetetra(-methylenephosphonic acid); n-butylnitrilo-di-(methylenephosphonic acid); N-methylnitrilodi-(methylenephosphonic acid); and N-ethylnitrilodi-(methylenephosphonic acid). The most preferred single sequestrant or chelating compound for utilization in the scale removal composition of the invention is 1-hydroxyethylidine-1, 1-diphosphonic acid, and the amine and alkali metal salts of this acid.

Where salts of the described acids are used, or are formed in situ, the preferred cations involved in the salt formation are those derived from ammonia or ammonium hydroxide, ethylenediamine and alkali metal hydroxides. The moxt preferred single cationic species used in the salt formation is the ammonium ion. Since the action of the active material is a sequestering or chelating action in which the iron of the magnetite scale is chemically combined with the acid, or the salt derived from the acid, it is important that the presence of any competitive species of compound which would compete with the sequestering material in the taking up and dissolution of the iron be avoided or minimized. Since the alkali metal ions display some tendency to compete with the active ingredient in this respect, and the ammonium does not suffer this disadvantage, he ammonium constitutes the preferred cation in phosphonate salts used as the active ingredient. There are occasions, however, upon higher temperature usage of the cleaning process of the invention, where the volatility of ammonia may render its usage less desirable than the usage of the alkali metal hydroxides for salt formation due to the susceptibility of the system under such conditions to the shifting of pH from an optimum range upon volatilization of the ammonia.

It will be beneficial, before further departure from the discussion of the basic compounds which may be utilized in forming salts of the polyphosphonic acids used in the invention, to refer to the buffering or pH adjusting compound which may also be included in the aqueous solution used for the removal of magnetite scale. The most general usage of the composition of the invention is caried out under alkaline conditions and, as will be hereinafter explained, for some extremely valuable applications of the method of the invention, maintenance of the pH of the cleaning solution during treatment at a relatively high value is desirable. For the purpose of adjusting and maintaining the pH within this frequently desired range of alkalinity during metal treatment, the pH adjusting or buffering material to which reference has been made is added to the aqueous solution. Convenience dictates that the same material be utilized as that which is utilized, in some instances, for formation of the salts of those acids useful in the composition employed in the invention. Thus, the preferred pH adjusting or buffering compounds are amines, including ammonia and ammonium compounds, and alkali metal hydroxides. Of these, the most preferred for general usage is ammonium hydroxide. Others which are suitable include ethylenediamine, sodium hydroxide, potassium hydroxide, lithium hydroxide, monoethanolamine, diethanolamine and triethanolamine.

Although the type of water used in the aqueous solutions containing the active materials described above is not critical to the practice of the invention, there are many applications of the process of the invention which make it desirable on such occasions to use potable water, or water which is as nearly salt-free as possible, such as demineralized water.

The amount of the active acid or salt sequestering compound utilized in practicing the invention may vary over a wide range. Aqueous solutions which contain as little as 0.5 weight percent of the sequestering agents are effective in removing magnetite scale under some temperature and pH conditions. A practical upper limit on the concentration of the preferred polyphosphonic acids in the aqueous solution, discernible on the basis of economic considerations, is 7.5 weight percent, subject, however, to the desired use of substantially lower concentrations when the temperature of the solution is elevated as hereinafter described. In general, the most effective and the preferred concentration range of the several sequestrant materials in the aqueous solution, however, is from about 1.5 weight percent to about 6 weight percent. When the most preferred sequnntrant, i.e., 1-hydroxyethylidene-1, 1-diphosphonic acid, or an operable salt thereof, is utilized, a concentration of from about 1.5 to about 5.0 weight percent is most effective in usage. In this range, the cleaning solution demonstrates excellent iron complexing capability, and has a relatively high carrying capacity for dissolved iron.

The amount of pH adjusting material which is used in the composition will be varied in accordance with the pH at which it is desired to conduct the cleaning operation. Thus, it is apropriate to speak of the amount of pH adjusting or buffering material used in the composition as an effective amount, with it being understood that the most often used pH range over which the process of the present invention is carried out is from about 7.0 to about 10.25. A preference for alkaline pH conditions is, to some extent, dictated by customs of the trade which favor alkaline treatment of boilers and related equipment, but effective scale removal can be accomplished in a pH range of from about 4 to about 7. Where an ammonium compound is utilized for pH adjustment, and particularly, ammonium hydroxide, it will usually be desirable to add a sufficient amount of the ammonium compound to commence the cleaning process near the upper end of a pH range over which it is desired to conduct the cleaning. This will then allow for some loss of ammonia by volatilization so that the pH, though it drops some over the period of cleaning, will still be within the desired range at the termination of the cleaning operation.

In addition to the active component of the composition, i.e. the acid or salt sequestrant, and the pH adjusting material, where such is included in the composition, the composition preferably contains a small amount of a corrosion inhibiting compound. This compound functions, in the course of the cleaning procedure, to protect the metal surface from direct attack by the cleaning composition. It is, of course, true that in some occasional metal cleaning operations, the removal of small amounts of metal from the surface being cleaned is not intolerable, but this will rarely be the case, and, in general, about 0.1 weight percent or more corrosion inhibiting compound is included in the composition. An amount of 0.1 weight percent of corrosion inhibitor has usually been found to be sufficient to attain maximum corrosion inhibition. It is particularly important that the inhibitor be included when the scale removal is carried out at relatively high temperatures, i.e., from about 225° F to about 300°to F. Typical corrosion inhibiting compounds which can be effectively employed in the compositions of the invention include, but are not limited to, alkyl pyridines, quaternary amine salts and dibutylthiourea, and mixtures of these materials with each other and/or with carrier or surface active materials, such as ethoxylated fatty amines.

It has been further determined that, in order to reduce or retard the formation of an undesirable, iron-containing precipitate of polymeric character which occurs under certain conditions of relatively high temperature of contact, and extended contact times, the aqueous cleaning solution can desirably include from about 0.25 weight percent to about 0.5 weight percent of ammonium bifluoride which functions to reduce the occurrence of such undesirable precipitate, or at least to extend the time over which contact of the cleaning solution with the metal substrate may be carried out before such precipitate commences to occur.

As has been previously indicated herein, when an effective amount of the described composition is utilized for scale removal, and the process is carried out within a certain relatively high pH range, copper, as well as magnetite scale, can be removed from the metallic substrate. Since, in many types of water-carrying heat exchange equipment, copper deposition on the metal surfaces in contact with the water occurs concurrently with the encrustation of the surface with magnetic scale, this aspect of the invention constitutes a particularly valuable and utilitarian feature thereof. The particular compositions which are useful in the process of the invention for the removal of copper from the metal substrate, in addition to the magnetic scale, are those which contain, in addition to the components previously described, an oxidant which is capable of oxidizing the iron present from a ferrous to ferric valence state. It is necessary that this be accomplished in order for the copper removal to be effective, since the ferrous iron will otherwise be competitive with the copper in reacting with the oxidizing agent. Additionally, a sufficient amount of the oxidant should be present in the composition to oxidize to cupric ions, all of the copper which has been deposited on the metal substrate, and which it is desired to remove. This permits the copper to exist in a valence state which facilitates its complexing with the sequestrant in the solution. Since the amount of the oxidant compound which is included in the compositions for a particular magnetite and copper removal operation will obviously vary widely according to the amount of magnetite and copper scale which is encountered, the amount of oxidizing compound which should be included can only be described as at least an amount sufficient to stoichiometrically oxidize all of the lower valence iron in the scale removing solution at the time after all of the magnetite scale has been removed, and an additional amount which is equal to, or exceeds, the stoichiometric quantity required for reacting with all of the copper which is to be removed from the metallic substrate.

A number of types of oxidizing compounds can be included in the scale removal composition when the composition is to be used for removing both copper and magnetite scale from metal substrates. Typical oxidants which can be effectively employed include, but are not limited to, the alkali metal bromates, the alkali metal peroxides, the alkali metal persulfates, potassium permanganate, hydrogen peroxide, and the alkali metal and amonium nitrites.

The amount of scale removal composition which should be employed in carrying out the process of the invention is not susceptible to precise definition since the amount of iron-containing scale will vary from one cleaning job to another, as will the amount of copper to be removed from the substrate in certain instances. Further, in any given instance, it is not possible to calculate or estimate, except by a rough approximation, the amount of magnetite and/or copper which may be present on the metallic surface to be cleaned. In general, however there must be utilized an amount of the scale removal composition such that, considering the concentration of the active sequestrant material therein, there is a sufficient amount of the latter material to combine stoichiometrically with the amount of magentite scale which is present, and which is to be removed, and with the amount of copper which is to be removed. Use of amounts of the sequestrant in the scale removal composition in excess of the stoichiometric amounts described is not deleterious to the operation of the invention, except when a point is reached at which the dissolved acids or acid salts and pH adjusting materials unsuitably limit the carrying capacity of this solution for the sequestrant-iron complex which is formed as the scale is removed. This limitation is generally encountered, however, only at a point where economic desiderata have already dictated a limitation to the amount of cleaning solution employed, and the amount of active material which is included in such cleaning solution. The reaction between the acid (or salt) sequestrant and the copper-containing scale, where such is to be removed, can be electrochemically monitored, wherein the presence of an oxidant included in the solution is measured. Thus, in this instance, the absence of oxidant indicates the probability that copper-containing scale is still present.

With respect to the minimum amount of scale removed compositon which is employed in contacting the metal surface to be cleaned, care should be exercised to assure that the concentration of iron in the scale removal composition does not increase above certain maximum levels when the process is carried out at relatively high temperatures (at or above 175° F), and over extended contact times. This concern for exceeding a certain maximum iron content of the solution at such times and under these conditions is predicated upon our observations that a thick white precipitate is formed where the period of contact of the cleaning solution with the metal surface is protracted, and the temperature during such contact is relatively high. The occurrance of this undesirable phenomenon, requiring time-consuming clean up procedures, is discussed in greater detail hereinafter, as is the control of certain process parameters which we have determined to be necessary for the purpose of avoiding the formation of such precipitate.

It has been surprisingly observed that when contact of the aqueous phosphonate cleaning solution with boiler tubes to be cleaned is carried out at a temperature of 200° F, a thick white precipitate commences to form after about the eighth hour of contact, and increases rapidly thereafter. Although the scale encrustations are successfully and effectively removed from boiler tube surfaces, the presence of the precipitate requires an undesirable extension of the time of completion of the cleaning project. An analysis of the chemical and physical properties of the precipitate thus formed has indicated it to be of a polymeric character, containing iron complexed with a polyphosphonate radical.

Investigation of the conditions under which the undesirable precipitate forms has indicated that four process parameters are important with respect to the development of the precipitate. Below temperatures of about 175° F, the precipitate does not appear to form under most operative and useful conditions of solution pH, time of contact of the cleaning solution with the substrate, and iron concentration of the cleaning solution. As the temperature is increased to above 175° F, the precipitate appears to be formed within increasingly shorter time periods. Moreover, as the concentration of iron (including the ferric and ferrous species thereof) in the cleaning solution are increased at any given temperature above about 175° F, the formation of the precipitate is accelerated in the sense that the initial time of appearance of the precipitate is observed to occur at an earlier point in the process. It has also been observed that increasing the concentration of the active polyphosphonic acid or its salt in the cleaning solution has the effect of promoting the formation of the precipitate, and accelerating the time of its appearance in the cleaning solution.

In these and further tests and experiments, it has been determined that the formation of the described undesirable precipitate can be suppressed or retarded by the addition of small amounts of ammonium bifluoride to the cleaning solution, and that the addition of this additive also has a desirable effect of decreasing the corrosion rate experienced in the use of the cleaning solutions used in the process of the invention. Where the ammonium bifluoride is employed to help control and retard precipitate formation, the amount of this additive employed in the aqueous cleaning solution is preferably from about 0.25 weight percent to about 0.5 weight percent.

In the course of closely examining the conditions and parameters which affected the formation of the described precipitate, it was determined that, contrary to previously assumed pH limitations imposed upon cleaning operations carried out in the relatively low temperature range of from about 140° F to about 180° F (which limitations were thought to limit the pH of the solution which could be employed at such temperatures to a range of from 4 to 7), the process could actually be very effectively carried out in this temperature range using solutions having a pH of from about 4 to about 8, and that, in fact, the most suitable results, when the temperature of the cleaning solution was between 140° F and 180° F, were observed to occur when the pH was maintained between about 7 and about 8.

The results of the described investigation of the conditions under which the observed undesirable precipitate is formed in the course of metal cleaning operations have led to the conclusion that the preferred temperature range for carrying out the removal of iron-containing scale from the metallic substrate is from about 140° F to about 175° F, since, even at the upper end of this range, the white precipitate does not form for approximately 25 or 30 hours of contact time unless the iron content of the solution exceeds about 0.9 weight percent. This maximum period of contact and this maximum iron content are usually well in excess of those which will be utilized in almost all cleaning operations. The preferred temperature of operation within the described range is about 150° F in that in this instance, the white precipitate seldom has been observed to occur prior to about 30 hours of contact time, and iron concentrations in the cleaning solution of up to 1 weight percent do not seem to accelerate precipitate formation. Moreover, as indicated previously, the solution pH which is suitable at this temperature has been found to range from 4 to 8, thus permitting the operation to be carried out under either alkaline or acid conditions.

As the temperature at which the contact is carried out is increased above 175° F, it is desirable to control both the iron content of the solution and the time of contact of the solution with the metal surface to be cleaned. It is also desirable to limit the concentration of the active sequestrant in the solution. Thus, it is preferred, when operating at a temperature of about 180° F, to maintain the concentration of the polyphosphonic acid or its salt in the aqueous solution at a level not exceeding about 2.5 weight percent, and the iron concentration of the cleaning solution below about 0.9 weight percent. The latter parameter should be decreased to about 0.5 weight percent when the contact is carried out at 200° F or above. Where the contact is carried out at 180° F, the time over which the contact is carried out preferably does not exceed about 20 hours, and this time of contact is then decreased as the temperature of contact increases so that, at about 200° F, the time of contact preferably does not exceed about seven hours, and is most preferably, six hours or less. At even higher temperatures than 200° F, suitable precipitate control is obtainable only by avoiding contact times exceeding about six hours, including from 0.25 to about 0.5 weight percent ammonium bifluoride in the cleaning solution, retaining the concentration of the polyphosphonic acid or its salt at a maximum concentration of 2.5 weight percent in the cleaning solution, and maintaining the iron concentration of the cleaning solution below about 0.5 weight percent. It will be apparent that, considering the limitations on contact time and the high solution circulation rates needed to effect successful scale removal without significant percipitate formation when temperatures exceeding 200° F are employed, it is very desirable to avoid operation at such higher temperatures where possible, even though at temperatures exceeding 180° F, solutions having a pH up to 10.25 can be used.

The described conditions directed to the avoidance of the formation of the undesirable polymeric precipitate relate to the use of the process of the invention in the removal of iron-containing scale from metallic substrates. Such considerations as have been described therefore apply to the first step of the two step procedure which is preferably employed when both an iron-containing scale and copper are to be removed from the substrate.

In the practice of the process of the invention, contact of the scale encrusted boiler, fitting or other metallic element with the scale removal composition is carried out by initially cooling or heating, as the case may be, the metallic member to a temperature within the range of from about 110° F to about 300° F. It will be understood from the foregoing comments relative to the formation of the undesirable precipitate which has been observed, however, that carrying out the process at a temperature above 200° F is not desirable, and that the most preferred temperature range to ulitlize is from 140° F to about 175° F. Concomitantly with the utilization of the preferred temperature range, a pH of from about 4 to about 8 can be utilized, with the preferred pH range being from about 7 to about 8. Although slightly longer times of contact are required when the preferred temperature ranges and pH conditions are employed in the removal of the magnetite scale, the avoidance of the undesirable precipitate formation which is achieved when such relatively low temperatures are utilized has clearly indicated the desirability of carrying out the process at such lower temperatures.

The particular temperature at which contact of the scale removal composition with the scale encrusted metallic substrate is initially carried out will be determined in many instances by the temperature at which the boiler or other structure has been operated or utilized immediately prior to the time of treatment. Thus, if the boiler has been on stream, cleaning following shutdown will often entail cooling the boiler down to a temperature in the upper portion of the operative temperature range specified, though in most instances, it will be very desirable to reduce the temperature of the boiler to 200° F or below. On the other hand, where the boiler or other equipment to be cleaned has been off stream, it will then be necessary to heat the structure up to at least 110° F, and preferably up to 140° F, before commencing the scale removal procedure.

When the metal to be cleaned has been brought to the appropriate temperature, an aqueous solution constituted in accordance with the invention is then introduced to the interior of the boiler, or into contact with the scale-encrusted surface. The solution is then preferably slowly circulated with pumps. The rate of circulation, in a given instance, and the quantity of make up solution added, will be dictated in part by the desirability of retaining the total maximum iron content of solution below those concentration values hereinbefore discussed. Thus, in general, at relatively high temperatures of operation, circulation rates and addition of make up solution will be higher so as to maintain the iron concentration at a lower level in the cleaning solution, and thus contribute, by such concentration control, to the avoidance of the formation of the described undesirable precipitate.

As indicated, it is preferable during the contact of the scale removal composition with the metal to be cleaned to maintain circulation of the cleaning composition so that efficient contact is maintained between the active sequestrant compound and the magnetite and/or copper to be removed. From time to time, additional amounts of the cleaning composition can be added to the original quantity placed within the boiler or in contact with the metal so that the capacity of the scale removal composition for dissolving all of the scale to be removed is ultimately sufficient to accomplish this objective.

In most cases, the pH at which the scale removal is to be effected will have already been taken into account by the inclusion of an effective amount of the buffering or pH adjusting material in the cleaning solution. In those instances where the acid sequestrant material hereinbefore described is reacted with a basic amine or alkali metal material to produce a phosphonate salt in situ, the aqueous solution of the acid can be initially located within the boiler, or otherwise in contact with the metallic surface to be cleaned, and the amine or alkali metal hydroxide can then be added to the aqueous solution in an amount sufficient to neutralize the acidic sequestrant, and to further provide the necessary pH adjustment.

The time period over which contact is maintained between the cleaning solution and the scale bearing metal can vary widely, subject, of course, to the considerations of undesirable precipitate formation hereinbefore discussed. At the relatively low processing temperatures of from about 110° F to about 175° F, the time of contact is generally not a critical consideration for, unless the iron concentration of the cleaning solution becomes unusually high, contact times up to 30 hours can be utilized without the occurrence of the precipitate, and this permissible period of contact is usually entirely adequate to accomplish and complete the efficient cleaning of most metal structures with any generally encountered degree of encrustation. In general, a minimum contact time of at least about 1 hour is needed, and the preferred minimum contact time in most usages is about three hours. There are important limitations on the preferred maximum amount of time that the scale removing composition is in contact with the scale encrusted metal where the process is carried out at relatively high temperatures. Such limitations are imposed to avoid the formation of the thick precipitate hereinbefore described.

Thus, as indicated earlier, at a temperature of contact of about 180° F, the contact time utilized preferably does not exceed about 20 hours when other conditions favoring suppression of the precipitate are optimized, i.e., an iron concentration of less than 0.9 weight percent and a sequestrant concentration of less than 2.5 weight percent. The time of contact which should be utilized then continues to decrease as the temperature increases so that, at a temperature of operation of about 200° F, a maximum time of contact of about 7 hours is preferably not exceeded. In instances where the particular metal cleaning problem requires the use of relatively high temperatures, and the encrustation is such that a longer contact time than those described would be desirable, the addition to the cleaning solution of about 0.25 weight percent to about 0.5 weight percent of ammonium bifluoride will extend the time of contact which can be utilized without development of the precipitate. The precise correlation between the degree of retardation of precipitate formation, and the amount of ammonium bifluoride added, in addition to the interrelationship in such instances of the other factors of iron concentration and sequestrant concentration, can be easily determined empirically by those practicing the method of the invention.

Time considerations are, of course, very important in many applications of the invention, since extended downtime on boilers and other heat exchange equipment is directly correlative to an economic loss attributable to such downtime and inoperativeness. It has been found most desirable to maintain contact between the cleaning solution and the metal to be cleaned over a time period of from about 3 hours to about 8 hours.

It is finally pointed out that, as would be expected, an interrelationship exists between the several process parameters such that variation in one or more of these parameters affects the determination of the most desirable value for another parameter which must be considered in carrying out the process. Thus, in general, carrying out the cleaning process at higher temperatures will reduce the total time of contact which is required between the cleaning solution and the metallic substrate. Moreover, the amount and type of corrosion inhibitor which is included in the composition is dependent upon both the temperature at which the process is carried out (with the higher temperatures generally requiring the inclusion of a relatively larger amount of corrosion inhibitor). The specific amounts of active sequestrant material included in the solution will depend upon the specific sequestrant used, the temperature at which the reaction is carried out and the objective of the process, i.e., removal of magnetite scale alone or removal of both magnetite scale, zinc scale and copper deposits.

With respect to the pressure at which the cleaning process of the invention is carried out, the pressure is in no way critical to the operativeness of the process. It has been observed, however, that an advantage is gained by carrying out the method at a pressure slightly in excess of atmospheric pressure in those cases where ammonia or ammonium hydroxide is utilized for the purpose of forming a salt with the acid sequestrant, and for functioning as a pH adjusting or buffering material. In order to prevent volatilization of the ammonia, resulting in a gradual reduction in the pH at which the process is carried out, a super-atmospheric pressure extending up to about 50 psig. appears to have beneficial results. To the end of realizing such pressure, closure of the boiler or other vessel in which the process is to be carried out and operation at autogenic pressure is desirable in those instances were an ammonium compound is utilized in the compositions employed in the invention.

Another aspect of the present invention is the utilization of an emulsion of the described aqueous sequestrant-containing solution with an oleaginous material for the purpose of cleaning oil-carrying lines and piping. Such systems include, for example, lubricating oil conduits used in turbines and similar machinery, and fuel oil-carrying lines used in fueling boilers. Such emulsions have been found to be highly effective in removing dirt, weld slag and debris from such conduits and lines, in addition to continuing to function effectively in the removal of iron-containing scale deposits. The oleaginous phase of the emulsion can be one or more of various oils or hydrocarbons, such as diesel oil, fuel oil, kerosine or various napththa cuts. The emulsion is generally made up by mixing the aqueous sequestrant solution with the oil or hydrocarbon in an aqueous to oil volumetric ratio of from about 3:1 to about 20:1, using an effective amount of an emulsifying compound to effect emulsification. In general, from about 0.5 to about 2.0 volume percent (based on the total volume of the emulsion) of the emulsifying agent will be utilized. From about 0.1 to about 0.5 volume percent (based on the total volume of the emulsion) of a surface active agent is preferably also added to the composition. A typical suitable emulsifying agent which has been successfully employed is a mixture of long chain carboxylic acid soap stocks which is commercially available. A typical suitable surface active agent is a commercially available mixture of ethoxylated straight chain alcohols.

Since one of the most important applications of the present invention is that entailing the removal of both magnetite scale and copper-containing scale from boilers and other structures susceptible to scale encrustation, it is believed that a more detailed description of a preferred practice of the process of the invention when this objective is comprehended will further enchance the reader's understanding of the invention and its merit. Where both magnetite scale and copper are to be removed, a salt, preferably an ammonium salt, of the polyphosphonic acid is formed, and this aqueous salt solution, with its pH adjusted to a value exceeding 7, is initially placed in contact with the metallic member to be treated. Contact, at a temperature of between about 110° F and about 200° F is established and is maintained from about 1 to about 8 hours, observing the foregoing described limitations upon the operation at temperatures exceeding 175° F. Preferably, a contact time exceeding about 3 hours is used. Operation under these conditions is usually sufficient to remove all of the magnetite scale from the metallic substrate. The system, including the metal treated and the cleaning solution, is then adjusted in its temperature, if necessary, to a temperature of from about 140° F to about 175° F, and preferably about 150° F.

Sufficient ammonium compound buffering agent is then added to the cleaning solution to adjust the pH to 9 or above, and preferably to about 9.5 The system is then permitted to remain at this temperature and pH for a period of up to about 6 hours, and well within this time (or at the commencement thereof), enough oxidant compound is added to the solution to oxidize all of the iron in the dissolved complex, which is present in the bivalent state, to the ferric or trivalent state, and additionally, to oxidize all of the copper adhered to the metal substrate to the cupric state.

After the completion of the total contact time for the purpose of removing the iron oxide scale and/or copper deposited upon the metallic substrate, the boiler or other structure being cleaned is cooled down to at least 100° F, and preferably ambient temperature, and the spent cleaning composition is then drained from the boiler or removed from contact with he metallic structure. The structure is rinsed with water. The spent scale removal composition is then treated by the addition of a calcium salt to the solution. This results in the formation of an insoluble calcium salt by reaction with the sequestrant material to displace the complexed iron therefrom. The insoluble calcium salt precipitates from the spent aqueous cleaning solution. Immediately following this, or actually concurrently with such precipitation, the iron which has been displaced from the complex will also precipitate from the solution, and easily disposable solid materials are thus recoverable, and the resulting innocuous aqueous solution can be discharged or used in regeneration of fresh cleaning solution.

The following examples are presented in further illustration of the invention, and should not be regarded as limiting the invention in any way. In the examples, the quantities of materials are expressed as weight percentages unless otherwise indicated. It may be pointed out that in some instances, the data derived from tests of the composition of the invention, and from various experimental practices of the methods of the invention, are not characterized by a high degree of precision or quantitative accuracy. In some instances, it is only possible to affirmatively state that certain scale deposits are apparently completely removed as determined by visual observation, and in other instances, to state that measurements carried out indicate clear trends in the quantity of scale removed by the employment of certain process parameters as compared to others. The necessarily broad and general interpretation of much of the data stems in large measure from the fact that it is not possible, or is extremely difficult, to predetermine the actual quantity of iron which may be present in the total scale deposit on a given piece of apparatus or on a metallic structure. The data does, however, clearly demonstrate the effectiveness of the present invention in the removal of iron-containing and copper deposits from a metallic substrate, and the capability of the invention of achieving the primary objectives of its conception and development.

EXAMPLE 1

A natural circulation boiler in use at a power generating company is cleaned by use of an aqueous solution of ammonium phosphonate using the procedure hereinafter described. The tubes of the boiler are encrusted with iron oxide scale, copper, some nickel oxide and some zinc oxide deposits. The general procedure utilized in the cleaning is to initially fill the boiler with the cleaning solution through the lower ring header, economizer and the rear water wall header up to the normal drum level. All fill valve of the boiler are then closed, and the boiler is heated to 200° F by firing the ignitors of the boiler. Occasionally, heating is terminated and the boiler is circulated by opening the lower header valves and draining back 4000 gallons of the cleaning solution to stand-by reservoirs, then opening the valve to the economizer and replacing the 4000 gallons of solution into the boiler through the economizer. Chemical analyses of the cleaning solution are carried out periodically during the cleaning of the boiler to determine the progress of the cleaning operations as indicated by the iron concentration of the cleaning solution.

In making up the cleaning solution, concentrated solution of 1-hydroxyethylidine-1,1-diphosphonic acid containing a small amount of a commerically available corrosion inhibitor is diluted with deionized water at 60° F. The phosphonic acid solution is then blended with ammonium hydroxide by addition of the acid solution to the ammonium hydroxide to adjust the pH to slightly below neutral (about 6.0). The cleaning solution as thus prepared contains about 2.5 weight percent of the active phosphonate chelant and 0.1 weight percent corrosion inhibitor.

Pumping of the cleaning solution into the boiler through the lower ring leader, economizer and rear water wall is then commenced, and in about 2 hours, between 35,000 and 40,000 gallons of the cleaning solution have been pumped into the boiler, and further filling of the boiler is terminated. At this time, the solution in the boiler has a pH of 6.5 and the temperature in the steam drum is 135° F.

About hour after the boiler is filled, heating of the cleaning solution in the boiler is commenced by turning on the ignitors of the boiler. The heating is then continued for 2 hours to bring the temperature up to 145° F. At this time, 200 gallons of the cleaning solution are removed from the boiler and are replaced by 200 gallons of concentrated ammonium hydroxide to raise the pH to about 8. After commencement of heating of the boiler, the corrosion of the mild steel tubes is continuously monitored by the use of a commerically available corrosion rate meter.

About seven hours after filling the boiler (about 6 hours after firing of the boiler is commenced), the temperature of the cleaning solution has stabilized at about 200° F, and the pH of the solution is 7.6. The concentration of the remaining active chelant in the solution at this time is about 1.8 weight percent, and the total iron content of the cleaning solution is 1,929 pounds. About 8 hours after filling of the boiler (7 hours after commencement of the heating of the solution), the ignitors are turned off to terminate the heating. Periodic surging of the system is continued to assist in circulation of the cleaning solution. The iron content of the solution levels and becomes stable about one hour after termination of the heating. At about 2 hours after the termination of the heating of the solution, force draft fans are turned on to commence cooling the system. About one hour later (10 hours after commencement of heating), while the temperature of the solution is still at slightly less than 200° F, the development of a thick white precipitate is noticed in the cleaning solution. As the cooling progresses, the precipitate increases and causes problems of plugging of a gauge glass on the steam drum of the boiler and the plugging of sample lines.

Cooling of the boiler is continued until a temperature of about 150° F is reached 22 hours after the initial filling of the boiler with the cleaning solution, and about 19 hours after commencement of the heating. After the cleaning solution reaches the temperature of 150° F, and, about 24 hours after initially filling the boiler (21 hours after commencement of heating), 3000 gallons of aqueous solution containing 6800 pounds of ammonia and 1600 pounds of sodium bromate are added to the solution in the boiler after removal of an equivalent amount of cleaning solution, and the resulting solution is surged in the boiler for a period of about 4 hours. Following this, the solution is drained from the boiler and the boiler is then filled to normal operational level with rinse water. After rinsing and flushing several times to remove the precipitate, the boiler is inspected for removal of scale deposits and found to be clear and free of scale.

The results of the onsight analyses of the temperature, pH, chelant concentration and iron concentration of the cleaning solution, as measured during the cleaning of the boiler, are set forth in Table I. p The white precipitate which developed during the cleaning of the boiler is collected and submitted for chemical analysis. The results of this analysis are set forth in Table II.

Analysis of the cleaning solution at various stages of the cleaning process indicates that the amounts of iron oxide scale, copper, zinc oxide and nickel oxide referred to in Table III are removed in the course of the cleaning procedure.

TABLE I

| Time, hrs. | Temp., °F | pH | Wt. Percent Chelant | Lbs. $Fe_3O_4$ |
|---|---|---|---|---|
| 0 | (Pumping of solution into boiler commenced) | | | |
| 2 | (Pumping stopped) | | | |
| 3 | (Ignitors turned on - Heating started) | | | |
| 5 | 145 | 6.0 | 1.17 | 856 |
| 6 | 150 | 8.3 | — | — |
| 6.5 | 150 | 7.3 | 2.5 | 1,877 |
| 8 | 180 | — | — | — |
| 9* | 200 | 7.6 | 1.8 | 1,929 |
| 9.25 | 200 | 7.6 | 1.7 | 2,427 |
| 10 | (Heating terminated) | | | |
| 11 | 200 | 7.6 | 1.7 | 2,551 |
| 12** | 200 | 7.6 | 1.7 | 2,551 |
| 13 | (White precipitate noted) | | | |
| 14 | 180 | — | — | — |

*Sample from drawback from water wall
**(Fans turned on to begin cooling boiler)

TABLE II

Analysis of White Precipitate

| Component Analyzed | Weight Percent* |
|---|---|
| Fe | 21.0 |
| Cu | 1.0 |
| Ni | 0.8 |
| Zn | 0.45 |
| Mg | 0.43 |
| Ca | 0.087 |
| $NH_4$ Diphosphonate | 58.0 |

*Weight percent here refers to parts by weight of the component per 100 parts by weight of the total white precipitate.

TABLE III

Amount of Deposit Removed

| Element Analyzed | Assumed Form | Pounds Removed* |
|---|---|---|
| Fe | $Fe_3O_4$ | 2,440 |
| Cu | Cu | 103 |
| Zn | ZnO | 93 |
| Ni | NiO | 34 |

*Based on estimated 40,000 gallons volume.

EXAMPLE 2

A series of laboratory tests are conducted to determine the effect, if any, upon the formation of the undesirable white precipitate during the process of the invention at high temperatures, of varying several of the process parameters. In each of the tests, approximately one liter of ammonium 1-hydroxyethylidine-1,1-diphosphonate cleaning solution is utilized, with the pH of the cleaning solution adjusted to about 7.4. The cleaning solution is placed in a sealed glass flask, along with a weighed amount of iron oxide ($Fe_3O_4$) and the solution is mechanically stirred through the tests. The tests are carried out at various temperatures and various concentrations of the chelant in the aqueous solution. The concentration of iron in the chelant solution is also measured at intervals, with the highest values, of couse, being those experienced toward the end of the period of contact, except when some of the iron is found in the precipitate which is formed. The corrosion rate is also monitored during some of the tests. In some of the tests, a small amount of ammonium bifluoride is added to the cleaning solution. In all of the tests, a small amount of iron powder is added to the flask to produce a reducing environment similar to that present during a boiler cleaning operation. The results of these tests are set forth in Table IV.

TABLE IV

| Test No. | Temp., °F | Wt. Percent Chelant | Amount of $Fe_3O_4$, gm./lit. | Wt. Percent Additive | Observations | Range of Fe Concentration, Wt., Percent | Mild Steel Corrosion Rate, lbs/ft²/day |
|---|---|---|---|---|---|---|---|
| 1 | 150 | 3.5 | 10.0 | — | Trace white ppt., 51 hrs | 0.72–0.87 | — |
| 2 | 150 | 2.5 | 10.0 | — | No white ppt., 28 hrs | 0.71–0.83 | 0.111 |
| 3 | 175 | 3.5 | 10.0 | — | White ppt., 6 hrs | 0.83–0.67 | 0.263 |
| 4 | 175 | 2.5 | 10.0 | — | White ppt., 21 hrs | 0.62–0.38 | 0.232 |
| 5 | 175 | 2.5 | 7.5 | — | No ppt., 19 hrs | 0.60 | 0.223 |
| 6 | 175 | 2.5 | 6.0 | — | Slight white ppt., 19 hrs | 0.59 | 0.368 |
| 7 | 175 | 2.5 | 4.0 | — | Slight white ppt., 24 hrs | 0.36–0.49 | 0.31 |
| 8 | 175 | 2.5 | 2.0 | — | No ppt., 47 hrs | 0.22–0.39 | 0.42 |
| 9 | 175 | 2.5 | 10.0 | 0.25 ABF | Slight white ppt., 22 hrs | 0.68–0.72 | 0.047 |
| 10 | 175 | 2.5 | 10.0 | 0.50 ABF | Slight white ppt., 32 hrs | 0.72–0.81 | 0.058 |
| 11 | 175 | 2.5 | 5.0 | — | Trace white ppt., 22 hrs | 0.45–0.50 | — |
| 12 | 200 | 3.5 | 10.0 | — | White ppt., 5 hrs | 0.59–0.19 | — |
| 13 | 200 | 2.5 | 7.5 | — | White ppt., 7.5 hrs | 0.56–0.59 | 0.118 |
| 14 | 200 | 2.5 | 6.0 | — | White ppt., 7 hrs | 0.52–0.54 | 0.17 |
| 15 | 200 | 2.5 | 4.0 | — | White ppt., 8 hrs | 0.40–0.36 | 0.26 |
| 16 | 200 | 2.5 | 10.0 | 0.50 ABF | White ppt., 16 hrs | 0.95–0.08 | 0.097 |

As will be perceived in referring to Table IV, no significant amount of the white precipitate forms within 50 hours in those tests which are carried out at 150° F, even when the concentration of the chelant in the aqueous solution is 3.5 weight percent. An iron level of 0.87 weight percent is reached when these conditions are employed and the higher concentration of the chelant solution is used.

When the cleaning process is carried out at 175° F, a white precipitate forms within 6 hours when the 3.5 weight percent chelant solution is employed. It will be noted, however, that when the iron concentration in the cleaning solution and the concentration of chelant in the solution are decreased, the time at which the precipitate is developed is retarded to about 21 hours. Moreover, amounts of magnetite added to the solution of 7.5 grams per liter, or less, represent more realistic (in terms of actual field experience) concentrations of the scale as encountered in actual cleaning operations, and it will be noted that in these instances, the precipitate does not form, in general, within about 20 hours, which time of contact is usually more than adequate for such usually encountered cleaning operations.

In Tests 9–11, carried out at 175° F, varying amounts of ammonium bifluoride are added to the cleaning solution. It will be perceived that this additive retards the time of formation of the white precipitate, and that the addition of 0.5 weight percent of this additive appears to be more effective in this respect than the addition of lesser amounts thereof. It is also observed in these tests that the corrosion rate of mild steel in the solution is decreased significantly by the addition of the ammonium bifluoride.

The results of Tests 12–15 carried out at 200 ° F show that even with a chelant concentration as low as 2.5 weight percent, and relatively low iron concentration in the solution, the white precipitate develops within a few hours. Test 16 demonstrates that by adding ammonium bifluoride to the solution, and using a chelant concentration not exceeding 2.5 weight percent, cleaning contact can be maintained up to 16 hours before the precipitate forms.

In summary, the test results set forth in Table IV indicate that the development of the undesirable white precipitate does not occur where the cleaning operation is carried out at 150° F, provided the dissolved iron content of the cleaning solution is maintained below about 0.9 weight percent; that the addition of small amounts of ammonium bifluoride to the cleaning solution allows the cleaning to be carried out at higher temperatures over a longer contact time before the precipitate commences to form; and that where the contact is carried out at about 175° F, it is preferable to retain the concentration of the chelant in the cleaning solution at less than 2.5 weight percent, and, where the chelant concentration is as high as 3.5 weight percent, to retain the concentration of iron in the cleaning solution at less than about 0.7 weight percent, unless the ammonium bifluoride additive is included in he cleaning solution.

EXAMPLE 3

A field test is conducted involving the precleaning of lines in the tubine oil system of a newly constructed steam electric generator system. The cleaning solution utilized contains about 2.0 weight percent ammonium 1-hydroxyethylidine-1, 1-diphosphonate and has an initial pH of 6.6 The lines to the turbine oil system are filled with the cleaning solution and circulation is continued during the tests. The initial temperature after filling of the system is 120° F, and the pH is 6.7. The temperature of the system is then brought up to about 190° F and the tests continue with periodic monitoring of the temperature, pH and iron content of the cleaning solution. The values obtained in this periodic analysis are shown in Table V. Following the 4 hour cleaning period, ten gallons of ammonium hydroxide and two gallons of 35 weight percent hydrazine solution are added to the cleaning solution for the purpose of passivating the cleaned surface. The passivation is carried out for a period of about 15 minutes, during which time the temperature of the solution is 190° F and the solution has a pH of 9.2.

TABLE V

| Time, hrs. | Temp., ° F | pH | Wt. Percent Iron in Solution |
|---|---|---|---|
| 0 | (Filling of system with cleaning solution complete; heating started) | | |
| 0.5 | 120 | 6.7 | — |
| 1.5 | 190 | 6.7 | 0.007 |
| 2.0 | 200 | 6.9 | 0.046 |
| 2.5 | 200 | 7.2 | 0.140 |
| 3.0 | 190 | 7.1 | 0.140 |
| 3.5 | 190 | 7.1 | 0.150 |
| 4.0 | 190 | 7.1 | 0.150 |
| 4.5 | 190 | 7.1 | 0.160 |
| 4.75* | 190 | 9.2 | 0.160 |

*Passivation step underway after adding 10 gallons aqueous ammonia and 2 gallons of hydrazine.

It will be perceived that the cleaning procedure is here carried out in a period of about 4 hours. The passivation followed by rinsing requires about an additional hour. The leveling of the iron concentration in the cleaning solution after about the third hour and at a temperature of 190° F indicates that all of the scale has been removed from the piping. Visual examination of the piping after the tests confirms this result. The results of the tests indicate that if cleaning can be completed in a relatively short time, and the iron content of the cleaning solution is maintained at relatively low levels, no problem of precipitate formation is encountered.

EXAMPLE 4

A fuel oil system to be used for fueling a newly installed boiler of a public utility company is cleaned, using an emulsion of diesel oil and the aqueous chelant solution of the present invention. The emulsion is formed by mixing 600 gallons of 2.0 weight percent ammonium 1-hydroxyethylidine-1, 1-diphosphonate with 60 gallons of diesel oil, 6 gallons of a commercially available emulsifier and about 1 gallon of a commercially available ethoxylated long chain alcohol surfactant.

The emulsion is pumped through the fuel oil system and then through a 60 mesh screen filter which is periodically changed as it becomes blocked by pieces of weld slag, loose mill scale and debris removed from the solution during cleaning. During the cleaning operation which is carried out for 11 hours, the temperature, pH and iron concentration of the emulsion are periodically measured. The results of the measurements are tabulated in Table VI.

Inspection of the piping of the fuel oil system after cleaning reveals that substantially all of the weld slag and mill scale is removed, and that all of the magnetite except a very small amount of tightly adherent magnetite has been removed from the piping.

TABLE VI

| Time, Hrs. | Temp. ° F | pH | Wt. Percent Iron in Solution |
|---|---|---|---|
| 0 | (System filled with cleaning solution; | | |

TABLE VI-continued

| Time, Hrs. | Temp. °F | pH | Wt. Percent Iron in Solution |
|---|---|---|---|
| | | (circulation started) | |
| 1 | 110 | 6.0 | 0.021 |
| 2 | 110 | 5.8 | 0.031 |
| 3 | 110 | 5.8 | 0.095 |
| 5 | 110 | 5.7 | 0.190 |
| 6 | 110 | 5.7 | 0.190 |
| 7 | 110 | 5.7 | 0.230 |
| 8 | 110 | 5.7 | 0.230 |
| 9 | 110 | 5.7 | 0.230 |
| 10 | 125 | 5.7 | 0.230 |
| 11 | 140 | 5.7 | 0.237 |

EXAMPLE 5

In a series of tests, sections of mild steel pipe equivalently roasted to provide magnetite scale encrustations thereon are each immersed in 100 ml. of a 2.5 weight percent aqueous solution of ammonium 1-hydroxyethylidine-1, -diphosphonate containing 0.05 weight percent of a commercially available corrosion inhibitor. The flasks containing the several pipe sections are then heated to various temperatures for a period of 6 hours, after selective adjustment of the cleaning solution pH by addition of aqueous ammonia. The results of these tests are portrayed in Table VII.

TABLE VII

| Test | pH | Temp., °F | Final Condition of Specimen |
|---|---|---|---|
| 1 | 7.0 | 140 | clean |
| 2 | 7.5 | 150 | clean |
| 3 | 8.0 | 175 | clean |
| 4 | 8.0 | 120 | clean |

The results of these tests illustrate the effectiveness of the cleaning solution at temperatures ranging between 120° F and 175° F over a pH range of from 7.0 to 8.0 when a contact time of 6 hours is utilized.

EXAMPLE 6

Copper coupons of substantially equal size are suspended, after weighing, in each one of the iron-containing cleaning solutions developed in the tests carried out as described in Example 5. The temperature of each of the solutions is adjusted to 150° F, and the pH of each solution is elevated to 9.5 by the addition of aqueous ammonia. As an oxidant material, 0.5 weight percent of sodium bromate is added to each solution. After 6 hours each coupon is removed from its respective solution and weighed. The dissolution of copper, as reflected by coupon weight loss, is shown in Table VIII.

TABLE VIII

| Sample | Coupon Weight, gms. Before | After | Wt. Loss, grams |
|---|---|---|---|
| 1 | 19.1296 | 18.6264 | 0.5032 |
| 2 | 20.1884 | 20.1440 | 0.0444 |
| 3 | 20.2280 | 19.7365 | 0.4915 |
| 4 | 19.8200 | 19.2705 | 0.5495 |

Although certain preferred embodiments of the invention have been herein described for illustrative purposes, it will be appreciated that various modifications and innovations in the procedures and compositions cited may be effected without departure from the basic principles which underlie the invention. Changes of this type are therefore deemed to lie within the spirit and scope of the invention except as the same may be necessarily limited by the appended claims or reasonable equivalents thereof.

What is claimed is:
1. A method for removing iron-containing scale from metal substrates having copper or a copper-containing scale thereon while avoiding the formation of a precipitate comprising contacting for a period of at least one hour, at a temperature of from about 110° F to about 175° F, and at a pH of from about 7 to about 8, the scale bearing substrate with an aqueous solution consisting essentially of water, and from about 0.5 weight percent to about 3.5 weight percent of at least one compound selected from the class consisting of polyphosphonic acids (1) and (2), the amine salts of said polyphosphonic acids and the alkali metal salts of said polyphosphonic acids, acids (1) and (2) being structurally defined as follows:

where $R_1$ is selected from the class consisting of $C_1$–$C_{12}$ alkyl groups, and the group

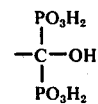

and

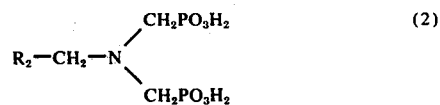

where $R_2$ is selected from the class consisting of —H—, —$PO_3H_2$, $C_1$–$C_{12}$ alkyl groups, and the group

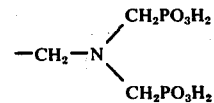

and
in the course of said contacting, circulating the aqueous solution to attain a total effective volumetric quantity thereof in contact with the substrate to maintain maximum iron concentration of said solution at less than about 1.0 weight percent;
wherein said method is further characterized in including the subsequent steps of:
adjusting the temperature of the aqueous solution to bring the aqueous solution to a temperature in the range of from about 140° F to about 175° F;
adding an effective amount of a buffering compound to adjust the pH of the aqueous solution to at least 9.0;
adding an oxidant compound to the aqueous solution in an amount effective to oxidize all ferrous ions present in the solution to ferric ions, and all copper contacted by the solution to cupric ions; and after said addition, maintaining contact between said solution and said scale-bearing substrate for a period of time sufficient to remove adhered copper from the substrate.

2. A method as defined in claim 1 wherein said compound present in an amount of at least 0.5 weight percent in said aqueous solution is an ammonium salt of one of said organic polyphosphonic acids.

3. A method as defined in claim 1 wherein said buffering compound is ammonium hydroxide.

4. A method as defined in claim 1 wherein said oxidant is selected from the group consisting of sodium bromate, sodium nitrite and hydrogen peroxide.

5. A method as defined in claim 1 wherein said contact is carried out for a period of from about one hour to about 20 hours at a temperature of about 175° F, and said compound is present in said aqueous solution in a concentration of less than about 2.5 weight percent.

6. The method of removing magnetite scale from a metallic substrate comprising:
contacting the scale-bearing substrate for a period of at least one hour and less than about 6 hours, at a temperature of from about 200° F to about 300° F, and a pH of from about 4 to about 10.25, with an aqueous solution consisting essentially of water, from about 0.25 to about 0.5 weight percent of ammonium bifluoride, and from about 0.5 weight percent to about 2.5 weight percent of at least one compound selected from the class consisting of polyphosphonic acids (1) and (2), the amine salts of said polyphosphonic acids and the alkali metal salts of said polyphosphonic acids, acids (1) and (2) being structurally defined as follows:

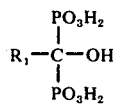  (1)

where $R_1$ is selected from the class consisting of $C_1$–$C_{12}$ alkyl groups, and the group

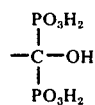

and

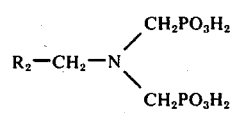  (2)

where $R_2$ is selected from the class consisting of —H—, —$PO_3H_2$, $C_1$–$C_{12}$ alkyl groups, and the group

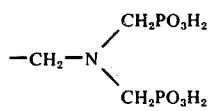

and
in the source of said contacting, circulating the aqueous solution to attain a total effective volumetric quantity thereof in contact with the substrate to maintain maximum iron concentration of said solution at less than about 0.5 weight percent.

7. The method defined in claim 6 wherein said aqueous solution consists essentially of water and ammonium 1-hydroxyethylidine-1, 1-diphosphonate.

8. In the method of removing iron-containing scale from a metallic substrate which comprises contacting the substrate for a period of at least one hour, at a temperature of from about 180° F to about 200° F, and a pH of from about 4 to about 10.25 with an aqueous solution consisting essentially of water and at least 0.5 weight percent of at least one chelant compound selected from the class consisting of polyphosphonic acids (1) and (2), the amine salts of said polyphosphonic acids and the alkali metal salts of said polyphosphonic acids, acids (1) and (2) being structurally defined as follows:

  (1)

where $R_1$ is selected from the class consisting of $C_1$–$C_{12}$ alkyl groups, and the group

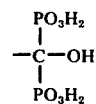

and

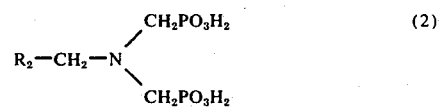  (2)

where $R_2$ is selected from the class consisting of —H—, —$PO_3H_2$, $C_1$–$C_{12}$ alkyl groups, and the group

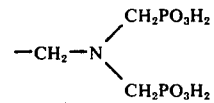

the improvement avoiding the formation of an insoluble, iron-containing polyphosphonate complex which comprises:
a. maintaining the concentration of said chelant compound in the aqueous solution below about 2.5 weight percent;
b. contacting the aqueous solution with the substrate for a period of less than 7 hours; and
c. contacting the substrate with a volume of the aqueous solution such that iron concentration in the aqueous solution does not exceed about 0.5 weight percent at any time during the cleaning contact.

9. The method defined in claim 8 and further characterized as including the step of adding to said aqueous solution prior to contacting the substrate therewith, from about 0.25 weight percent to about 0.5 weight percent of ammonium bifluoride.

10. In the method of removing iron-containing scale from a metallic substrate which comprises contacting the substrate for a period of at least one hour, at a temperature of from about 175° F to about 300° F, and a pH of from about 4 to about 10.25 with an aqueous solution consisting essentially of water and at least 0.5 weight percent of at least one chelant compound selected from the class consisting of polyphosphonic acids (1) and (2), the amine salts of said polyphosphonic acids and the alkali metal salts of said polyphosphonic acids, acids (1) and (2) being structurally defined as follows:

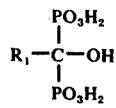  (1)

where $R_1$ is selected from the class consisting of $C_1$–$C_{12}$ alkyl groups, and the group

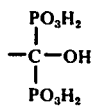

and

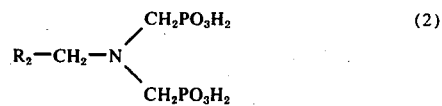  (2)

where $R_2$ is selected from the class consisting of —H—, —$PO_3H_2$, $C_1$–$C_{12}$ alkyl groups, and the group

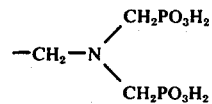

the improvement for retarding the formation of an insoluble, iron-containing polyphosphonate complex which comprises adding to said aqueous solution before contacting the substrate, an amount of from about 0.25 weight percent to about 0.5 weight percent of ammonium bifluoride.

11. The method defined in claim 10 and further characterized as including the step of limiting the time of contact of the substrate with the aqueous solution to a maximum of 6 hours.

* * * * *